(12) United States Patent
Tajima et al.

(10) Patent No.: US 7,398,055 B2
(45) Date of Patent: Jul. 8, 2008

(54) ELECTRONIC DEVICE AND PROGRAM

(75) Inventors: Koji Tajima, Tokyo (JP); Naoki Matsumoto, Tokyo (JP); Hiroaki Ban, Tokyo (JP); Kazuhiro Yamada, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 451 days.

(21) Appl. No.: 10/777,996

(22) Filed: Feb. 12, 2004

(65) Prior Publication Data

US 2004/0214526 A1 Oct. 28, 2004

(30) Foreign Application Priority Data

Feb. 14, 2003 (JP) ............... 2003-037275

(51) Int. Cl.
*H04B 7/00* (2006.01)
(52) U.S. Cl. ............. 455/41.2; 455/3.01; 455/3.05; 455/3.06; 455/552.1; 455/567; 455/569.2; 455/90.1; 370/471; 370/473; 370/474
(58) Field of Classification Search ............. 455/3.01, 455/3.05–6, 556.1–2, 575.1, 9, 90.1–3, 344–345, 455/414.1–4, 418–420, 41.1–2, 466, 551, 455/550.1, 552.1, 569.1–2, 566–567; 370/389–394, 370/471–476
See application file for complete search history.

(56) References Cited

U.S. PATENT DOCUMENTS

| | | | | |
|---|---|---|---|---|
| 2002/0164973 | A1* | 11/2002 | Janik et al. | 455/403 |
| 2002/0196912 | A1* | 12/2002 | Norris | 379/88.17 |
| 2003/0036824 | A1* | 2/2003 | Kuroda et al. | 701/1 |
| 2003/0156097 | A1* | 8/2003 | Kakihara et al. | 345/156 |
| 2004/0048622 | A1* | 3/2004 | Witkowski et al. | 455/456.6 |
| 2004/0203379 | A1* | 10/2004 | Witkowski et al. | 455/41.2 |
| 2005/0090279 | A9* | 4/2005 | Witkowski et al. | 455/550.1 |

FOREIGN PATENT DOCUMENTS

| | | |
|---|---|---|
| EP | 0 998 075 A2 | 5/2000 |
| EP | 1 115 071 A1 | 7/2001 |
| JP | 2000-57081 A | 2/2000 |
| JP | 2002-044742 | 2/2002 |
| JP | 2002-139326 | 5/2002 |
| WO | WO 97/30549 | 8/1997 |
| WO | WO 98/34350 | 8/1998 |
| WO | WO 99/16003 | 4/1999 |
| WO | WO 99/62248 | 12/1999 |

OTHER PUBLICATIONS

"JavaScript Browser Detection", XP002303708, URL: http://web.archive.org/web/20000302010738/http://www.pageresource.com/jscript/jbrowse.htm Mar. 2, 2000, 2 Pages.

(Continued)

*Primary Examiner*—Tuan Tran
(74) *Attorney, Agent, or Firm*—Brinks Hofer Gilson & Lione

(57) ABSTRACT

Content according to the present invention includes scripts, each of which is associated with an identifier of an electronic device in which device the script is executed. Upon receipt of the content, an electronic device specifies, using an identifier of the device, a script(s) to be executed in the electronic device and executes only the specified script(s). As a result, an application program suitable for the electronic device is provided to and executed on the electronic device.

15 Claims, 9 Drawing Sheets

OTHER PUBLICATIONS

Office Action with Japanese Patent Application No. JP2004-037418 (With Translation).
"JavaScript Browser / Platform Detection Script", Oct. 2004.

Yasushi Sakakibara, "Trouble prevention for WWW clients", Nikkei Open System, Nikkei Business, Inc., Apr. 15, 1999, vol. 73, pp. 146-148 (Concise Explanation of Relevance).

* cited by examiner

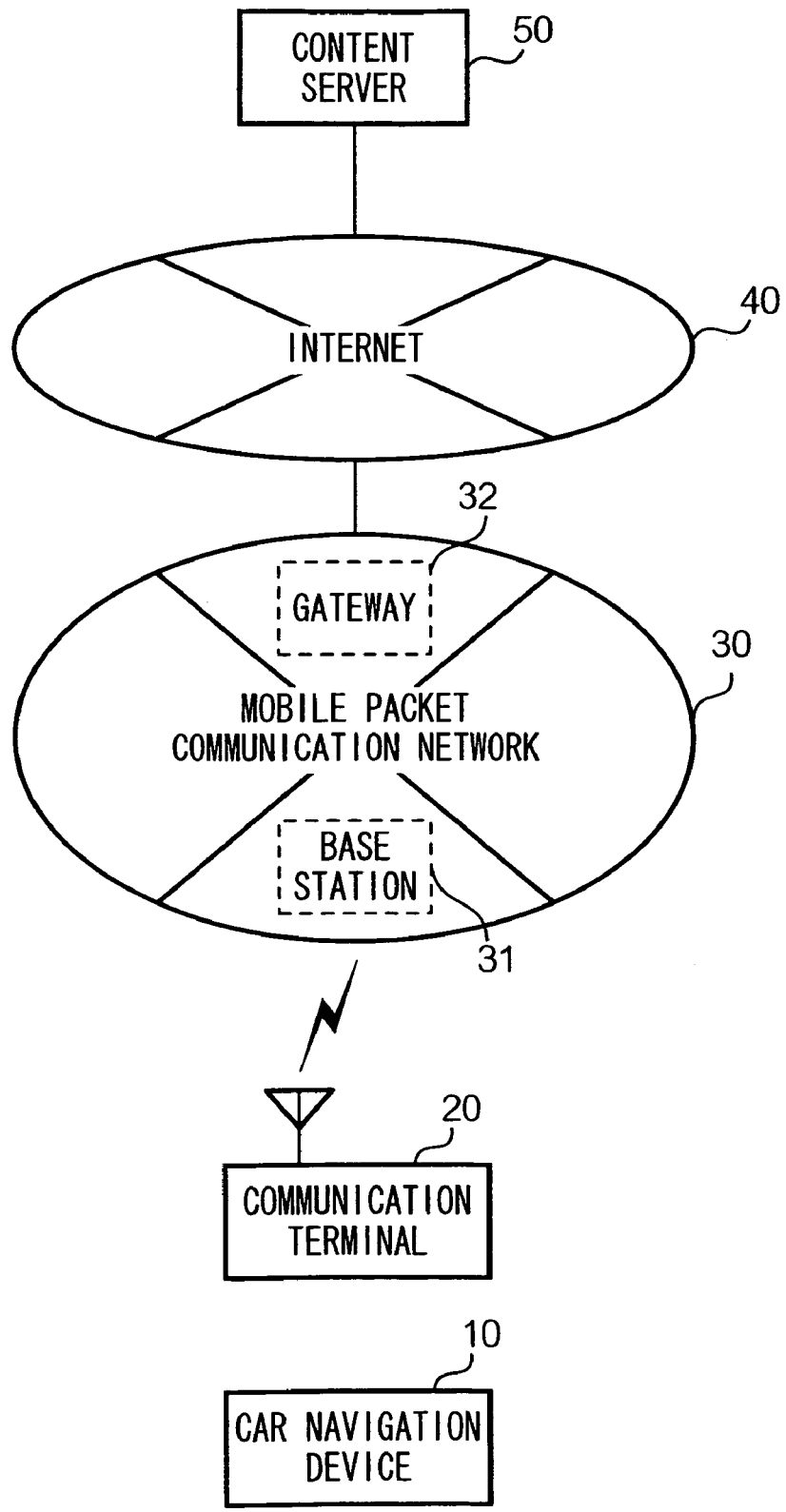

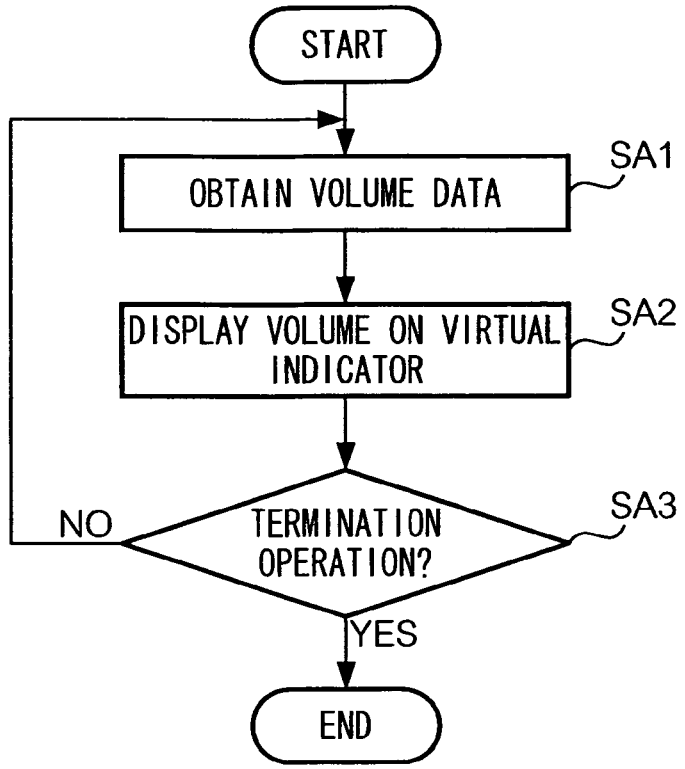
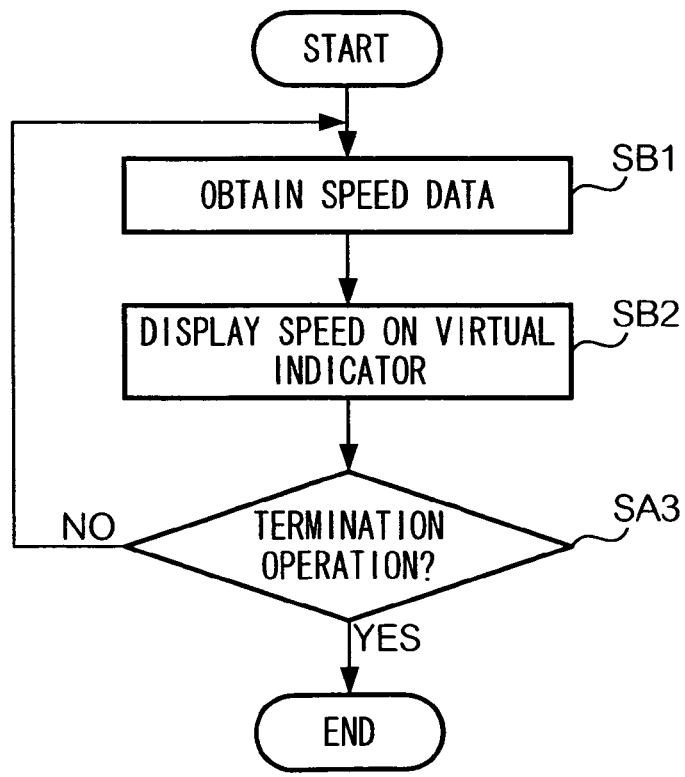

ELECTRONIC DEVICE AND PROGRAM

BACKGROUND OF THE INVENTION

1. Technical Field

The present invention relates to an electronic device and also to a program adapted for use with the electronic device, as well as with other different types of electronic devices.

2. Description of the Related Art

In recent years, mobile phones capable of handling a variety of content have come into common use. Such content may consist of an application program for execution on a mobile phone. Alternatively, such content may consist of image data for display on a mobile phone. To meet the demand for content for use on mobile phones an increasing number of content providers have come into existence.

In addition to mobile phones, content providers have begun to cater for other types of electronic devices which are capable of handling content, such as car navigation devices, audio devices, and so on. However, this market remains limited relative to that for mobile phones. Content developers are reluctant to develop content for electronic devices other than mobile phones, and a need exists in the market for increased content for such devices.

In view of these circumstances, consideration is now being given to developing content that is compatible for use not only on mobile phones but also on other types of electronic devices. One example of such content compatibility exists in the use of Hyper Text Markup Language (HTML), and in browser software for interpreting content written in HTML. To provide content that is compatible for use in different environments, software developers create different codes which are embedded in respective content to be used in different browser software, such as Internet Explorer™, Netscape Navigator™, and the like.

Prior art discloses an example of providing content compatibility for application programs for use in a variety of peripheral devices that can be connected to a main device. In utilizing the main device, a single application program is executed. Namely, only one program is implemented as an execution file, and other programs are implemented as dynamic link libraries (DLLs) in the device. Following execution of the file, if a peripheral device is then connected to the main device, determination is made as to whether coding used in the connected device is compatible with the executable program. If not, the executable program selects and executes one of the application programs that is adapted for use with the specific coding used in the peripheral device, thereby transferring control to that application program. In this way, the main device selectively executes application programs in accordance with the specifications of peripheral devices connected to the main device.

Using the technique outlined above, it becomes possible to adapt content for a mobile phone in a way that other electronic devices can utilize the content. However, using the described technique it is not possible for different types of devices to share the same content. The reason for this is that since content is designed to serve upon execution a function particular to one type of electronic device. For example, application program content for notifying a mobile phone user of an incoming call is not suitable for use in a car navigation device. Therefore, content for electronic devices other than mobile phones does not become popular, although a need exists in the market for content for such devices.

DISCLOSURE OF THE INVENTION

The present invention has been made with the object of providing content that can be used to serve a variety of functions on different electronic devices, and an electronic device for executing the content.

An electronic device of the present invention comprises: a storage for storing an identifier for identifying a type of the electronic device; obtaining means for obtaining a content which includes a plurality of scripts, each of which scripts is associated with an identifier for identifying a type of an electronic device; specifying means for specifying a script included in the content obtained by the obtaining means, the script being associated with the identifier stored in the storage; executing means for executing only the script specified by the specifying means.

Since, in one type of the electronic device, upon receipt the content, only script for the type of the device is interpreted and executed, a function particular to the type of electronic device is effective on the device It is possible that each of the plurality of scripts includes a shared part and a unique part.

BRIEF DESCRIPTION OF THE DRAWINGS

FIG. 1 shows an example of a communication system including communication terminal 20 and car navigation device 10.

FIG. 2 is a flowchart showing graphical sound notification processing performed by control unit 510 of communication terminal 20, in which JavaAPP1 is executed.

FIG. 3 is a flowchart showing speed notification processing performed by control unit 510 of car navigation device 10 using JavaAPP2.

DETAILED DESCRIPTION

Figure 4:
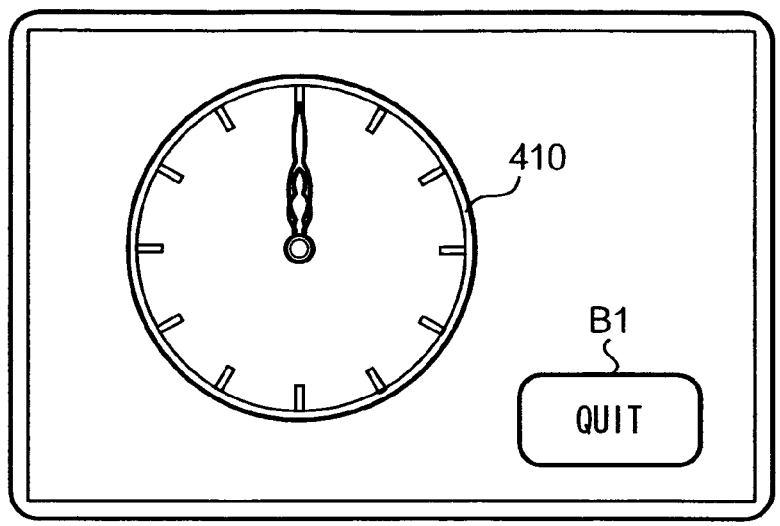
FIG. 4 shows an example of a screen image displayed in the communication terminal and car navigation device 10.

Preferred embodiments will now be described referring to the drawings.

<A. Configuration>

<1. Communication System>

FIG. 1 exemplifies a configuration of a communication system of the present invention, which includes a car navigation device 10 as one embodiment of an electronic device of the present invention and a communication terminal 20. A content server 50 shown in FIG. 1 has a hardware configuration of a general computer and is connected to an Internet 40. Content server 50 stores contents to be transmitted to communication terminal 20 and car navigation device 10 via Internet 40.

Content stored in content server 50 will now be described in detail. Content is data described in a markup language such as an eXtensible Markup Language (XML). Content 50 includes (a) scripts for performing a certain function when the script is executed on electronic devices including communication terminal 20 and car navigation device 10; and (b) identifiers each for identifying an electronic device 20 (a serial number of electronic device 20, for example). One example of the script is a JavaScript. In the following description, content is assumed to be described in XML. However, it is possible that content is described in other languages such as HTML.

A mobile packet communication network 30 serves packet communication service to communication terminal 20. Mobile packet communication network 30 includes a base station 31 and gateway (GW) 32. Mobile packet communication network 30 forms cells, in each of which, base station 31 carries out communication with communication terminal 20 located in a cell. Gateway 32 relays communication signal between mobile packet communication network 30 and Internet 40 by performing a certain protocol exchange.

Communication terminal 20 is a mobile phone, which has Java execution environment and a function of performing short range wireless communication via IrDA (Infrared data association), Bluetooth™ or the like, in addition to a function of performing voice and data communication.

With these functions, communication terminal 20 can download content from content server 50 via the mobile packet communication network and Internet 40, and store the content. In addition, communication terminal 20 can perform wireless communication with an electronic device via IrDA Bluetooth™ or the like. Further, communication terminal 20 can execute an object-oriented application program described in Java™, when the Java execution environment is established. It is to be noted that the Java execution environment is implemented to interpret and execute Java byte-code.

Car navigation device 10 can establish the Java execution environment and has the function of performing short range communication described above, in addition to a general navigation function using Global Positioning system (GPS), for example. With these functions, car navigation device 10 can receive content from communication terminal 20 and store the content.

This embodiment describes that a Java application program for interpreting and executing a script included in the content, and the script associated with an identifier of car navigation device 10 is stored in communication terminal 20 and car navigation device 10. Hereinafter, such an application program stored in communication terminal 20 and car navigation device 10 are referred to as "JavaAPP1" and "JavaAPP2", respectively. It is possible that these application programs are described in, for example, C or C++ Language.

<2. Content>

Content stored in content server 50 includes: (a) a script associated with the identifier of communication terminal 20 for performing processing of notifying the volume of a ringing bell which is set by a user of terminal 20 as shown in FIG. 2 (hereinafter referred to as "graphical sound notification processing"); and (b) a script associated with the identifier of car navigation device 10 for performing processing of notifying speed of a vehicle shown in FIG. 3 (hereinafter referred to as "graphical speed notification processing"). When the script for the graphical sound notification included in the content is interpreted and executed on communication terminal 20, an image as shown in FIG. 4 is displayed in terminal 20. When a call is issued, communication terminal 20 "drives" a virtual indicator 410 synchronous with a volume of a ringing bell to graphically notify a user of the communication terminal of an incoming call.

On the other hand, when interpreting scripts included in the content using JavaAPP2, car navigation device 10 also displays the image shown in FIG. 4. Obtaining the current speed of a vehicle to which car navigation device 10 is provided, car navigation device 10 "drives" virtual indicator 410 synchronous with the speed to notify a user of car navigation device 10 (a driver of the vehicle) of the current speed.

Figure 5:
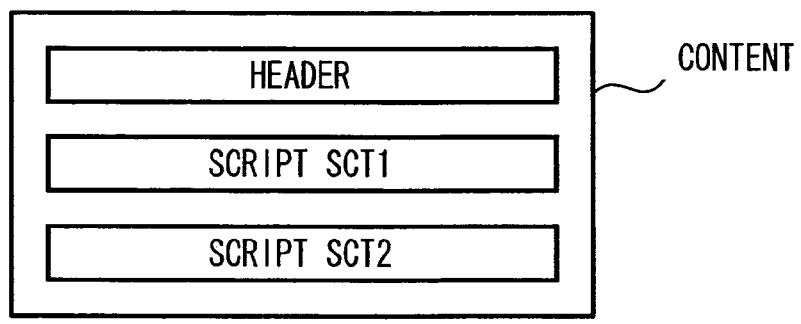
FIG. 5 is a conceptual diagram showing one example of data structure of the content.

FIG. 5 shows an example of a data structure of the content. As shown, the content described in XML includes a header, that is necessarily interpreted at first, and scripts for communication terminal 20 and car navigation device 10. The header stores information on relation between each of the scripts included in the content and identifier of devices (communication terminal 20 or car navigation device 10), on which the script should be executed. With this configuration, when the content is interpreted by a device, firstly, a script to be executed on the device is specified at the header, and only then the specified script for the device is interpreted and executed.

Figure 6:
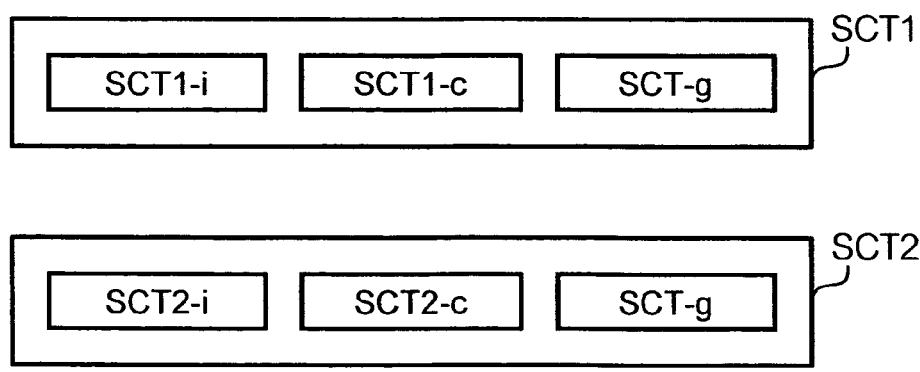
FIG. 6 is a conceptual diagram of each script.

FIG. 6 shows a structure of each script. As shown in FIG. 6, the script for communication terminal 20 SCT 1 further includes "sub-scripts" SCT1-$i$, SCT1-$c$, and SCT-g. SCT1-$i$ performs a function of obtaining a volume of the ringing bell. SCT-c performs a function of processing a value obtained by SCT-i for quantization. SCT-g performs a graphical user interface for displaying an image as shown in FIG. 4, in accordance with the value processed by SCT-c. Similarly, the script for car navigation device 10 further includes sub-scripts SCT2-$i$, SCT2-$c$, and SCT-g. SCT2-$i$ performs a function of obtaining the current speed of the vehicle. SCT2-$c$ serves a function of processing a value obtained by SCT2-$c$ for quantization. It is to be noted that SCT-g is included in both SCT1 and SCT2.

As shown in the figure, since a part of the sub-scripts in each script is the same as SCT-g, the same user interface is effective on different types of devices, namely communication terminal 20 (in fact, a mobile phone), and: car navigation device 10. This will be of benefit to a content provider in terms of the spread of content. On the other hand, the user will benefit from use of a desired user interface in communication terminal 20, as well as, car navigation device 10.

Figure 7A:
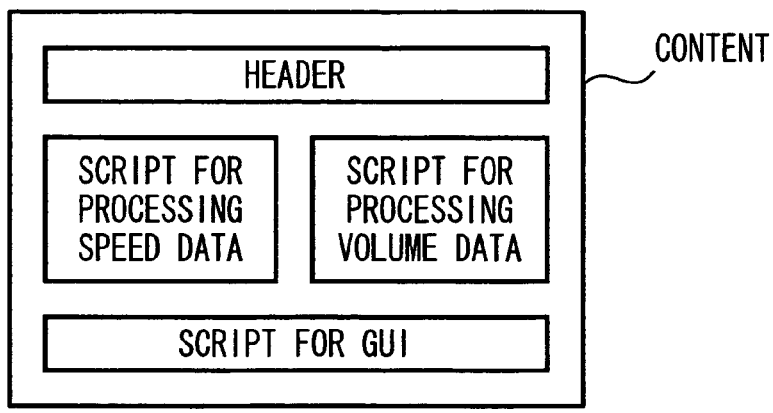
FIG. 7 is a conceptual diagram showing another example of data structure of the content.

FIG. 7A shows another example of the data structure of the content. The structure shown in FIG. 7A differs from that of FIGS. 5 and 6, in that the script for performing a user interface is described in only one area of the content. When this content is interpreted, firstly the header is interpreted to specify a script determined to be executed. Next, either a set of scripts for the communication terminal (SCT1-$i$ and SCT1-$c$) or a set of scripts for car navigation device 10 (SCT2-$i$ and SCT2-$c$)

is selectively executed according to a device on which the content is executed to output a value to script SCT-g. Next, script SCT-g displays an image according to the value. As shown in FIG. 7A, since a common script SCT-g is included in both scripts, the amount of data of the content will be reduced.

Figure 7B:
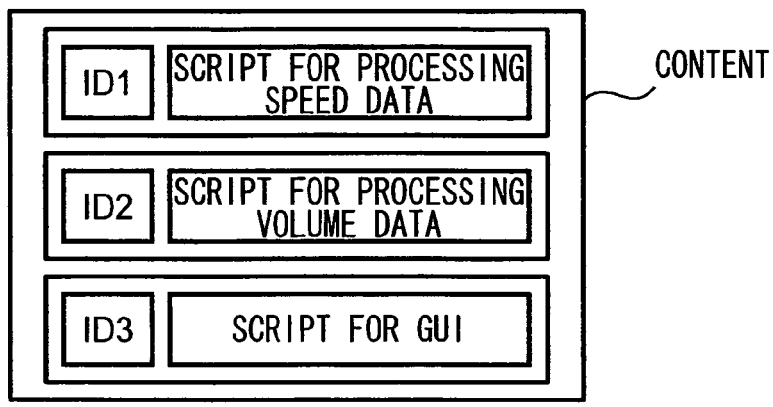

It is possible that every script in the content has a header for describing a code including an identifier, as shown in FIG. 7B. As shown in FIG. 7B, an ID code (ID1, ID2, or ID3) is imbedded in the top of each of the scripts. In this case, as a general rule, the scripts are interpreted according to a vertical sequence, namely, from top to bottom. However, when the ID code is interpreted, comparison of an identifier included in the script and the identifier of the device is performed. If the two identifiers coincide, the script is interpreted and executed. Otherwise, interpretation of the script is not executed, and the next script is interpreted. As a result, only script(s) associated with the identifier of the device is executed.

Further, it is possible that a short range communication between communication terminal 20 and car navigation device 10 is carried out by a cable through Universal Serial Bus (USB) interface. Communication between communication terminal 20 and car navigation device 10 is simply referred to hereinafter as "short range communication", regardless of being wireless or wired.

It is to be noted that communication terminal 20 is not restricted to a mobile phone. Communication terminal 20 may be some other device having functions of performing packet communication with content server 50 via Internet 40, executing an application program, and performing short range communication. For example, communication terminal 20 may be a PDA (Personal Digital Assistants) or another mobile computer.

Still further, it is possible that car navigation device 10 is an electronic device such as an audio device or an electric home appliance, which has functions of performing short range communication and executing an application program.

<3. Communication Terminal 20>

Figure 8:
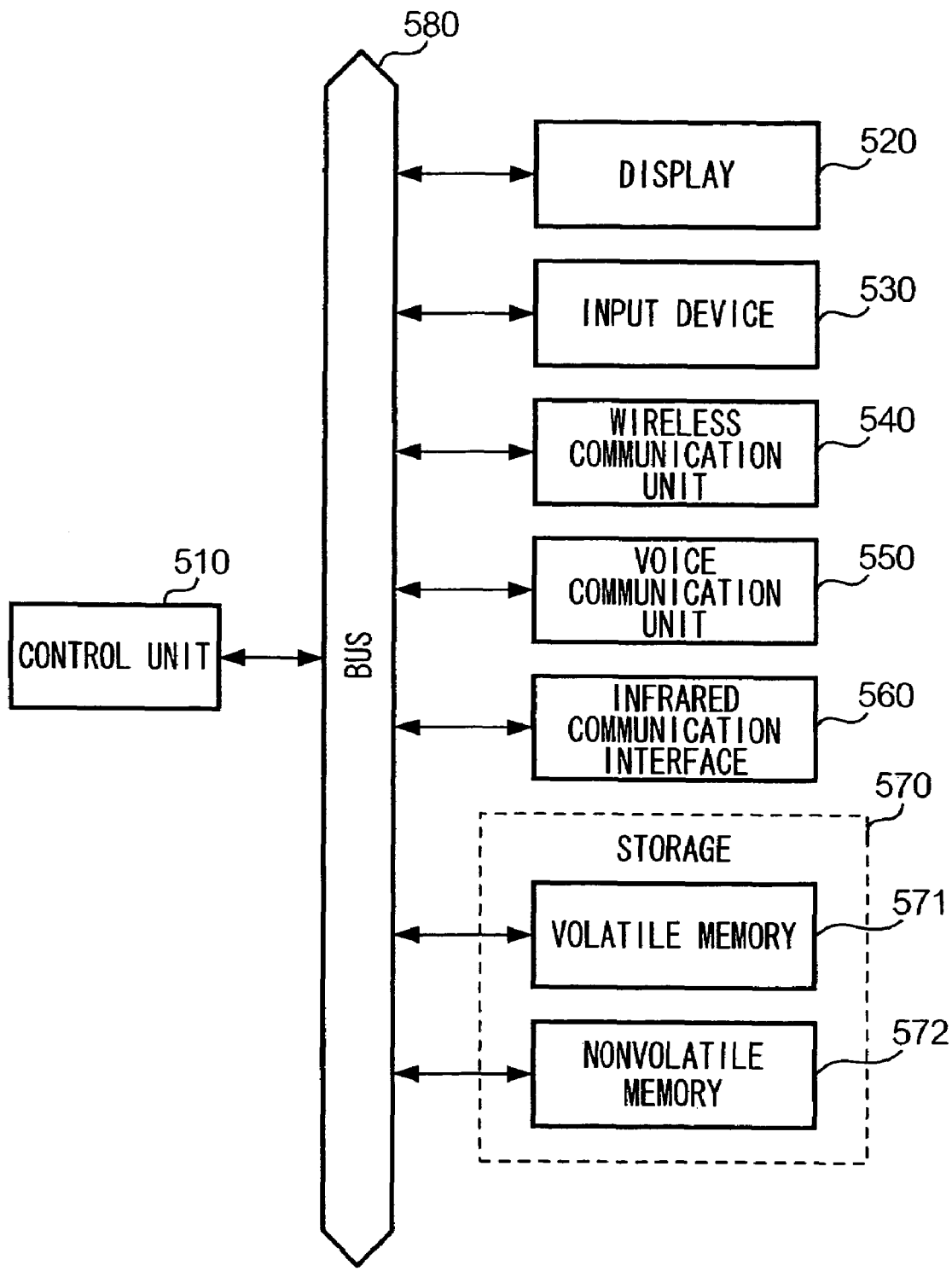
FIG. 8 is a configuration of communication terminal 20.

A configuration of communication terminal 20 will now be described referring to FIG. 8. As shown in FIG. 8, communication terminal 20 includes control unit 510, display 520, input device 530, wireless communication unit 540, voice processing unit 550, infrared communication interface 560, storage 570, and bus 580 for connecting all the units in communication terminal 20.

Control unit 510 is a CPU (Central processing unit), for example, which executes a software program stored in storage 570 to control all units of communication terminal 20. Display 520 may include a liquid crystal display panel and a drive circuit, which displays an image according to image data supplied from control unit 510. Input device 530 includes a device through which a user inputs numbers, characters, or instructions, which supplies a signal to control unit 510 in accordance with a user's operation.

Wireless communication unit 540 has an antenna (not shown), which carries out wireless communication with base station 31 covering a radio cell within which communication terminal 20 is located. Wireless communication unit 510 receives data transmitted from base station 31 to transfer to control unit 540 and transmits data supplied from control unit 510 to base station 31.

Voice processing unit 550 includes a speaker, microphone, and voice coder/decoder, which are not shown in the figure. Voice processing unit 550 converts a voice signal supplied by control unit 510 into voice data using the voice decoder to reproduce voice through the speaker. Also, voice processing unit 550 picks up a voice with a microphone and converts it to audio signal to output to wireless communication unit 540. In addition, voice processing unit 550 can obtain information on the volume of a ringing bell generated by the speaker, to output to control unit 510.

Infrared communication unit 560 carries out communication in conformity with the IrDA standard under control of control unit 510 to exchange data with an electronic device (car navigation device 10) using an infrared light. Specifically, infrared communication unit 560 includes a light emitting element, detecting element, and modulation/demodulation circuit. Infrared communication unit 560 emits a modulated infrared light to transmit data and demodulates an infrared light received by the detecting element to extract data.

Storage 570 includes a volatile memory 571 and nonvolatile memory 572. Volatile memory 571 is, for example, a Random Access Memory (RAM), which is used as a work area by control unit 510. Nonvolatile memory 572 is, for example, an Electrically Erasable Programmable Read Only Memory (EEPROM), which stores an identifier of communication terminal 20.

Nonvolatile memory 572 further stores an operating system (OS) software and other software necessary for executing JavaAPP1 and establishing the Java execution environment on communication terminal 20. In addition, a "scratch pad", which is a storage area for storing data generated during execution of JavaAPP1, is provided with nonvolatile memory 572. The scratch pad stores content downloaded from content server 50.

Figure 9:
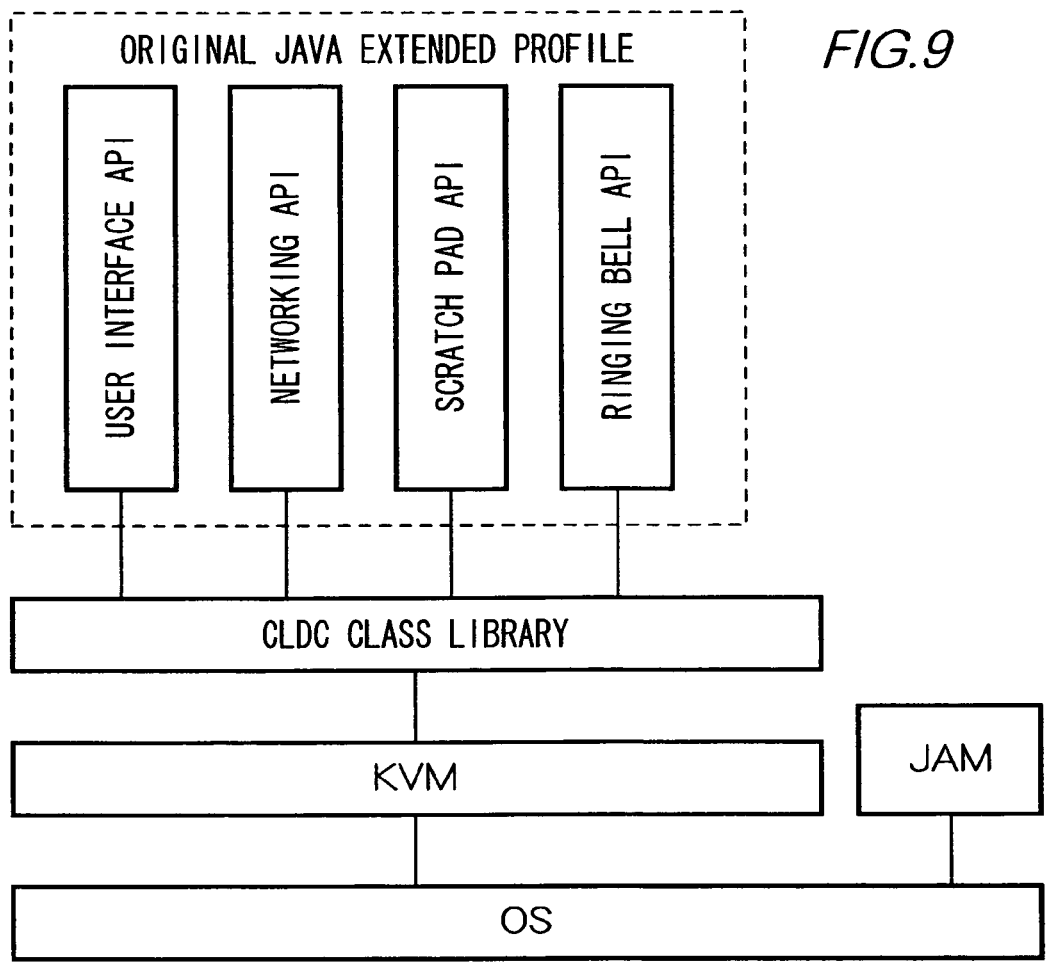
FIG. 9 shows a Java execution environment established in communication terminal 20.

Referring to FIG. 9, the software for establishing the Java execution environment installed in communication terminal 20 will now be described. As shown in FIG. 9, software which enables control unit 510 to establish the Java execution environment, is compatible with J2ME (Java2 platform Micro Edition). It is noted that J2ME is one of Java platforms designed for electronic home appliances. The software installed in the communication terminal includes KVM, CLDC (Connected Limited Device Configuration) class library, original Java extended profile, and JAM (Java Application Manager).

In this embodiment communication terminal 20 has the Java platform compatible with J2ME. Needless to say, it is possible that a Java platform compatible with J2SE (Java2 Standard Edition) or J2EE (Java2 Standard Edition) is employed. It is noted that J2SE and J2EE are Java platforms designed for a personal computer and a server such as content server 50, respectively.

KVM is a kind of JVM, which is designed for a hand held device such as a mobile phone and PDA. JVM translates a Java byte-code into a machine language in which control unit 510 can interpret and execute. CLDC class library performs a general function of a handheld device such as a mobile phone and PDA.

The original Java Extended Profile adds a function particular to a mobile phone operating under CLDC class library. The original Java extended profile includes APIs (Application Program Interface), such as a user interface API, networking API, scratch pad API, and ringing bell API. Control unit 510 calls these APIs by interpreting Java byte-codes included in JavaAPP1 to activate various functions. It is to be noted that an API is synonymous with a class (program) in this description.

User interface API provides a user interface to communication terminal 20. Networking API performs a function of accessing a network resource identified by a URL (Uniform Resource Locator). Scratch pad API performs a function of reading/writing data from or to the scratch pad. Ringing bell API obtains the volume of the ringing bell from voice processing unit 550 and outputs the volume to control unit 510.

JAM is software that manages under control of the OS, the Java application programs stored in communication terminal 20. Specifically, control unit 510 executes JAM to perform functions of installing/deleting the Java Application programs, displaying a list of names of the Java application programs stored in nonvolatile memory 572, and managing execution of the Java application program.

Specifically, the function of managing execution of the Java application program includes starting and terminating of the program. For example, when a user inputs an instruction of execution of JavaAPP1, control unit 510 dedicates under control of JAM, a work area in volatile memory 571 for executing JavaAPP1. Next, control unit 510 transfers byte-codes comprised of JavaAPP1 to the work area, to interpret and execute under control of KVM. When the user inputs an instruction of termination of JavaAPP1, control unit 510 stops interpreting and executing the byte-codes and releases the work area to terminate JavaAPP1.

In the Java execution environment as shown in FIG. 8, control unit 510 executes JavaAPP1 stored in nonvolatile memory 572 to perform the following three functions. The first function is to download content from content server 50 and store it to the scratch pad assigned to JavaAPP1. The second function is to transmit the content stored in the scratch pad to car navigation device 10 through infrared communication unit 560. The third function is to interpret a script included in the content stored in the scratch pad and the content associated with the identifier of communication terminal 20, to thereby execute on communication terminal 20 a 'graphical sound notification application'—an application for graphical notification of a call to the user.

<4. Car Navigation Device 10>

Figure 10:
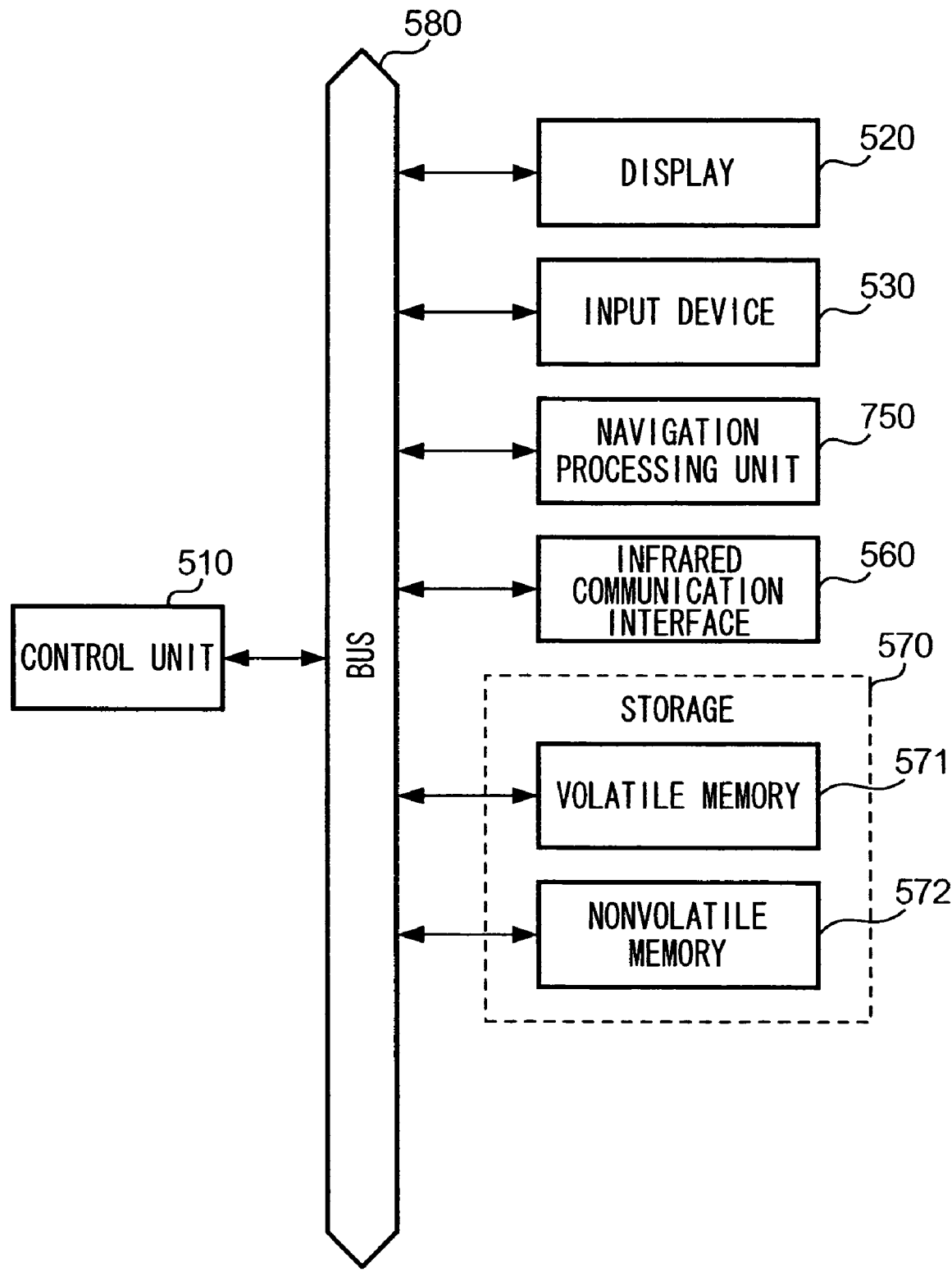
FIG. 10 shows a configuration of car navigation device 10.

Referring to FIG. 10, car navigation device 10 shown in FIG. 8 differs only in that (a) wireless communication unit 540 is provided and (b) navigation processing unit 750 is provided instead of voice processing unit 550.

Navigation processing unit 750 has a general function of GPS (Global Positioning System), which receives an electric wave from a satellite at regular intervals to identify a current position of a vehicle to which car navigation device 10 is provided. Also, navigation processing unit 750 displays a map of nearby areas and an icon of the vehicle together with the map on display 520 to notify the user of the current position and possible routes to the destination. Further, navigation processing unit 750 calculates a speed of the vehicle on the basis of positional change and the elapsed time, to output to control unit 510.

Figure 11:
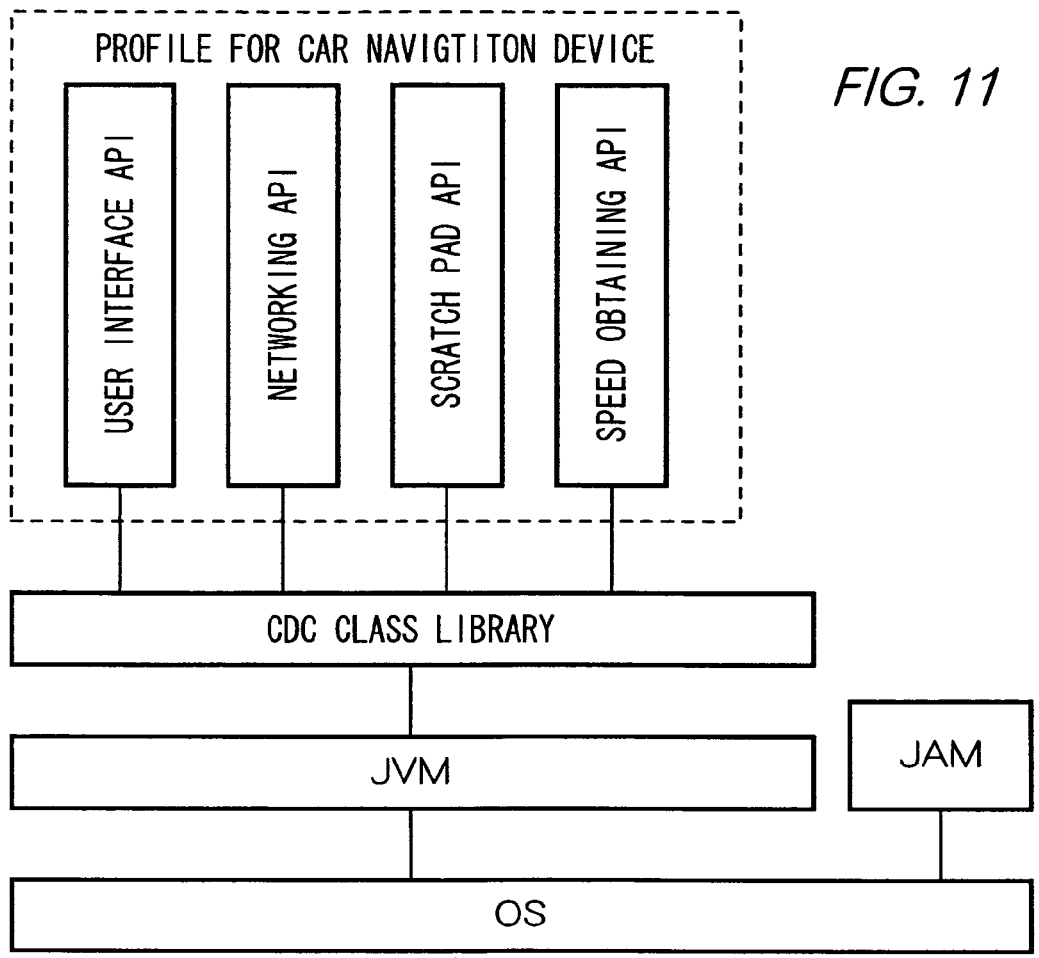
FIG. 11 shows a Java execution environment established in car navigation device 10.

Nonvolatile memory 572 of car navigation device 10 stores the same information as communication terminal 20, except for the three features described below. The first one is that an identifier of car navigation device 10 is stored instead of the identifier of communication terminal 20. The second one is that JavaAPP2 is stored instead of JavaAPP1. It is noted that a scratch pad of JavaAPP2 is provided in nonvolatile memory 572. The third one is that software for establishing a Java execution environment shown in FIG. 11 is stored instead of the one for the environment shown in FIG. 9. The software for establishing the environment shown in FIG. 11 will now be described in detail.

The Java environment shown in FIG. 11 differs in that (i) JVM is provided instead of KVM and (ii) a CDC (Connected Device Configuration) class library is provided instead of CLDC class library, and (iii) a profile for car navigation device is provided instead of the original extended profile.

CDC class library is designed for performing a general function for a middle or large sized electronic device such as a car navigation device or audio device. The profile of a car navigation device performs a function specialized for the car navigation device in addition to the functions provided by CLDC class library. Specifically, the profile for a car navigation device differs from the original Java extended profile in that an API for obtaining a speed of the vehicle, which is hereinafter referred to as a speed obtaining API is included instead of ringing bell API. When speed obtaining API is called by control unit 510 in which JavaAPP2 is running, the API obtains the current speed of the vehicle from navigation processing unit 650 to output to control unit 510.

Control unit 510 performs the following two functions in the Java execution environment shown in FIG. 11, by executing JavaAPP2 stored in nonvolatile memory 572. The first one is receiving content from the communication terminal with infrared communication unit 560 to store to the scratch pad for JavaAPP2. The second one is interpreting a script included in the content stored in the scratch pad and the content associated with the identifier of car navigation device 10 to thereby execute a 'speed notification application'—an application for notifying the speed on the car navigation device.

<B. Operation>

Characteristic operations carried out by car navigation device 10 and communication terminal 20 will now be described referring to the drawings.

EXAMPLE 1

Content Management in Communication Terminal

Figure 12:
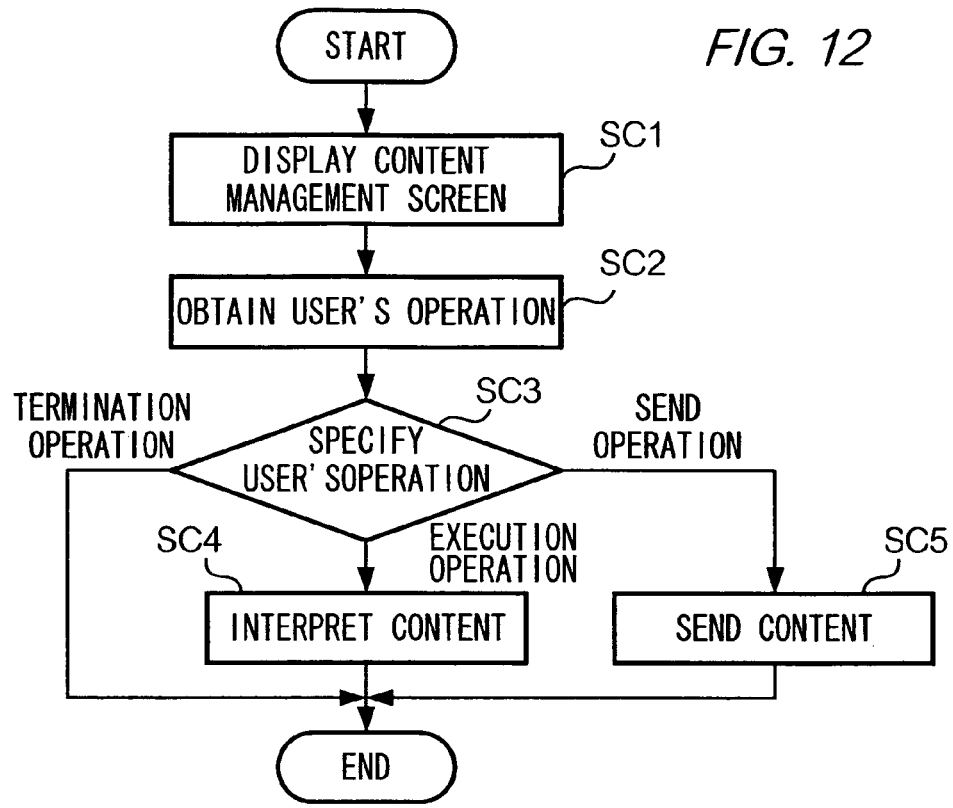
FIG. 12 is a flowchart of content management processing performed by control unit 510 of communication terminal 20 using JavaAPP1.

Referring to FIG. 12, management of content performed by control unit 510 of communication terminal 20, in which JavaAPP1 has been executed, will now be described. It is noted that in the following description communication terminal 20 should finish downloading and storing content, and JavaAPP1 and JavaAPP2 should be executed on communication terminal 20 and car navigation device 10, respectively.

Figure 13:
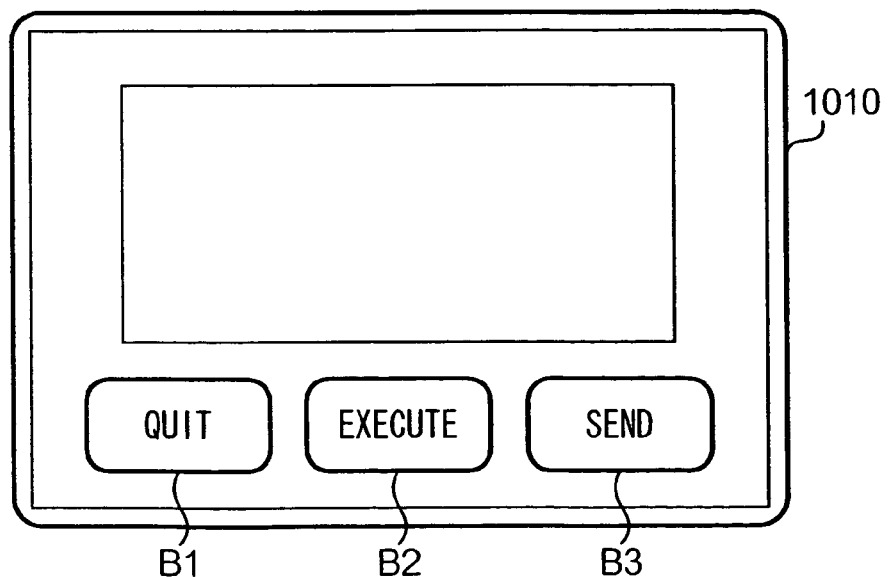
FIG. 13 shows an example of a content management screen displayed on display 520 of communication terminal 20.

Referring to FIG. 12, control unit 510 running JavaAPP1, directs display 520 to display an image shown in FIG. 13, which is hereinafter referred to as a "content management screen". Next, control unit 510 displays a name of the content stored in the scratch pad in display area 1010 (step SC1).

A user inputs instructions via input unit 530 while viewing the content management screen. Specifically, the user selects a name of the content displayed in area 1010 to specify the content and then 'presses' a QUIT button B1 for terminating the selected content, EXECUTE button B2 for executing the content, or SEND button B3 for sending the content to car navigation device 10.

Control unit 510 obtains an input signal from input device 530 (step SC2) to determine which operation the user has carried out (step SC3). If control unit 510 determines that the QUIT button is pressed, control unit 510 terminates execution of JavaAPP1. If control unit 510 determines that the EXECUTE button is pressed, control unit 510 reads from the scratch pad the content which is selected with the content management screen, and interprets and executes a script included in the content to thereby begin the graphical sound notification processing as shown in FIG. 2 (step SC4). Detailed explanation of the processing of interpretation and execution of the scripts will be described later.

If the control unit determines that the SEND button is pressed, control unit 510 reads the selected content from the scratch pad to make a copy of the content and transmits the copy to car navigation device 10 via infrared communication unit 560 (step SC5), and terminates JavaAPP1. In one example the SEND button B3 should be pressed after selecting content, and thus step SC5 should be carried out. Upon receipt of the content from communication terminal 20 via infrared communication unit 560, control unit 510 of car navigation device 10, in which JavaAPP2 is running, stores the content in a scratch pad assigned to JavaAPP2.

From the foregoing, in control unit 510 of communication terminal 20 the content selected by the user is transmitted to car navigation device 10 using JavaAPP1. Accordingly, the same content is stored in communication terminal 20 as well as car navigation device 10.

It is possible that before sending the content, control unit 510 determines whether car navigation device 10 has a function of interpreting the content, and only if car navigation device 10 has the function, control unit 510 transmits the content. In this case, unnecessary transmission of content can be avoided.

EXAMPLE 2

Interpretation of Script by Communication Terminal

Figure 14:
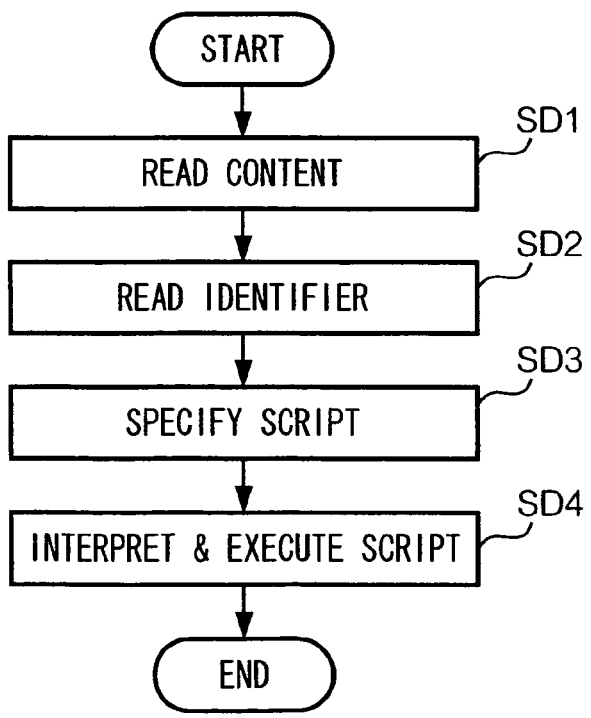
FIG. 14 is a flowchart showing processing of interpretation of a script using JavaAPP1 performed by control unit 510 of communication terminal 20.

Referring back to FIG. 13, when a user presses the EXECUTE button, the control unit of communication terminal 20 interprets the content using JavaAPP1. Referring to FIG. 14, control unit 510 firstly reads the content which is selected by the user using the content management screen of FIG. 13 from the scratch pad for JavaAPP1 and transfers it to volatile memory 571 (step SD1).

Next, control unit 510 reads the identifier from nonvolatile memory 572 (step SD2) to specify, on the basis of the identifier and the content, which script(s) included in the content should be executed on the communication terminal (step SD3). Specifically, control unit 510 determines that the script(s) associated with the identifier should be executed. It is to be noted that the order of reading the content and the identifier is exchangeable.

Next, control unit 510 interprets the specified script (step SD4). As a result, graphical sound notification processing is performed by control unit 510. Detailed description will now be given.

EXAMPLE 3

Graphical Sound Notification Processing

FIG. 2 shows an operation carried out on communication terminal 20 by control unit 510 in which JavaAPP1 is executed to perform the graphical sound notification processing by executing the script(s) included in the content, which is the script associated with the identifier of communication terminal 20. As shown in FIG. 2, control unit 510 firstly calls Volume obtaining API to obtain volume data of the ringing bell from voice processing unit 550 (step SA1).

Next, control unit 510 directs display 520 to display an image as shown in FIG. 4, where the virtual indicator is depicted according to the volume data (step SA2). Next, control unit 510 determines whether the QUIT button is pressed (step SA3). If the QUIT button is pressed (stepSA3, Yes), control unit 510 terminates interpreting the content. If the QUIT button is not pressed (step SA3, No), control unit 510 reiterates the steps starting from step SA1. In this way, an application of graphical sound notification is effected on communication terminal 20.

EXAMPLE 4

Content Management by Car Navigation Device

Figure 15:
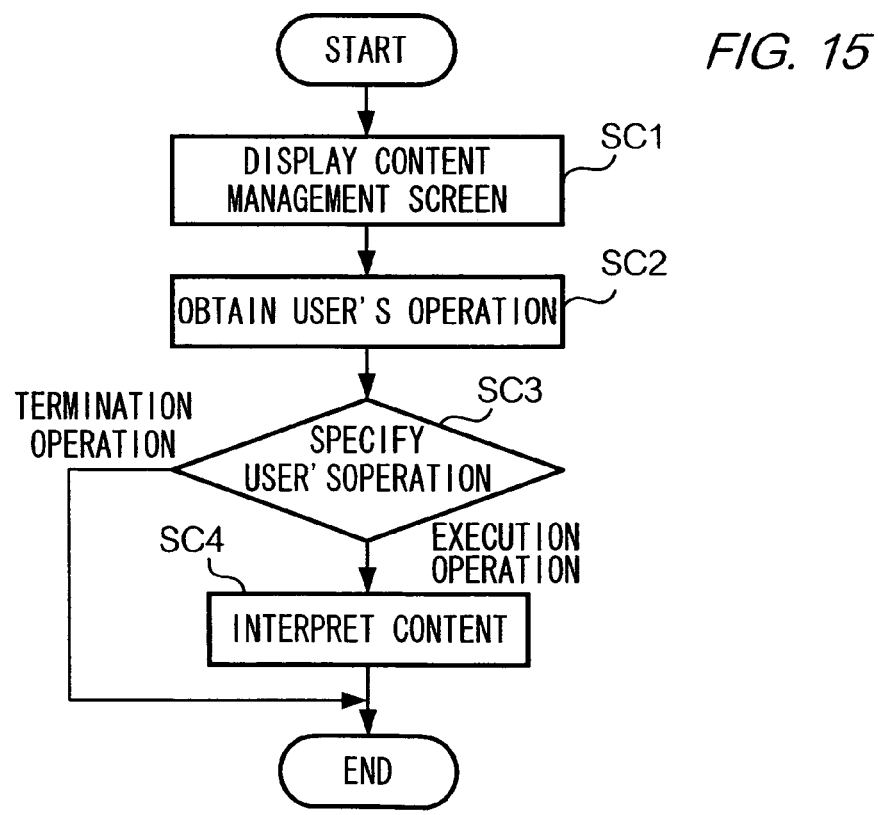
FIG. 15 is a flowchart showing content management processing performed by control unit 510 of car navigation device 10 using JavaAPP2.

Referring to FIG. 15, it will now be described that control unit 510 of car navigation device 10 on which Java APP2 is executed performs content management processing. It is to be noted that content should be transmitted by combination terminal 20 and stored in car navigation device 10.

Figure 16:
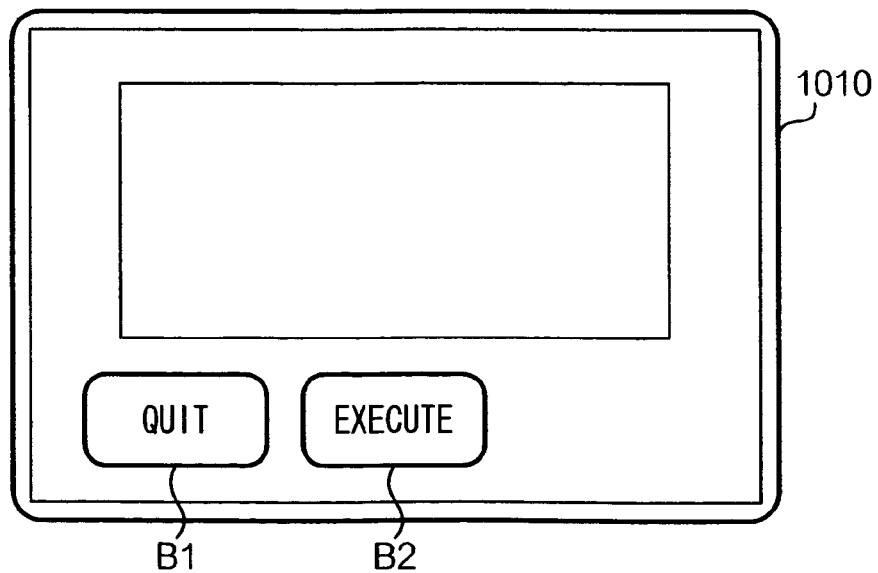
FIG. 16 is an example of a content management screen displayed on display 520 of car navigation device 10.

It is to be noted that content management processing shown in FIG. 15 differs only in that step SC5 of FIG. 12 is omitted. The reason is that the SEND button B3 is not provided to the content management screen displayed on display unit 520 as shown in FIG. 16. Namely, the user is allowed to only input direction of execution or termination of content using the content management screen. Since operations of execution and termination carried out by control unit 510 of car navigation device 10 is similar to those performed by control unit 510 of communication terminal 20, which is described above, detailed description of the operations is omitted.

Similarly, since interpretation of the content performed by control unit 510 of car navigation device 10 using Java APP2 is similar to the one carried out by control unit 510 of communication terminal 20 using JavaAPP1, which is shown in FIG. 14, detailed description is omitted. However, it is to be noted that in step SD2 of FIG. 14 the identifier of car navigation device 10 is read out instead of the identifier of communication terminal 20. Thus, the script(s) included in the content, which is the content associated with the identifier of car navigation device 10 is specified to be executed in step SD3 of FIG. 14. As a result, the speed notification processing shown in FIG. 3 is effected in control unit 510 of car navigation device 10.

EXAMPLE 5

Speed Notification Processing

The speed notification processing as shown in FIG. 3 differs from the graphical sound notification processing as shown in FIG. 2 in that steps SB1 and SB2 are provided instead of steps SA1 and SA2, respectively. Specifically, in step SB1, control unit 510 of car navigation device 10 obtains speed data of the vehicle using speed obtaining API from navigation processing unit 650. In step SB2, control unit 510 directs display unit 520 to display an image as shown in FIG. 4, where the virtual indicator is 'driven' according to the speed.

<C. Effects>

According to the embodiment, the same content can be provided to communication terminal 20, as well as car navigation device 10. Namely, script for performing the same graphical user interface is employed in the script for both, communication terminal 20 and car navigation device 10. Thus, a user can be notified of a call and the current speed of the vehicle by the same graphical user interface (screen image), thereby giving the user visual pleasure.

<D. Modifications>

In the above embodiment, JavaAPP1 and JavaAPP2 are preinstalled in communication terminal 20 and car navigation device 10, respectively. Needless to say, however, it is possible to install JavaAPP1 and JavaAPP2 to a mobile phone and car navigation device which have a Java execution environment respectively, to thereby providing the same function of terminal 20 or device 10 of the embodiment.

In this case, for example, content server 50 stores JavaAPP1 and JavaAPP2 in addition to the content. A mobile phone, which has a Java execution environment and functions of performing a packet communication and short range communication, downloads JavaAPP1 and JavaAPP2, in addition to the content. Next, the mobile phone installs JavaAPP1 and stores JavaAPP2 and the content in the scratch pad assigned for JavaAPP1. In this way, the same function of communication terminal 20 is provided to the mobile phone. The mobile phone transmits JavaAPP2 to the car navigation having the Java Execution environment, to thereby providing a function similar to car navigation device 10.

It is possible that JavaAPP1 and JavaAPP2 are stored in a computer readable storage medium such as a CD-ROM (Compact Disk-Read Only Memory) or FD (Floppy Disk), via which medium JavaAPP1 or JavaAPP2 is installed to an electronic device, thereby providing the same function as that of communication terminal 20 or car navigation device 10.

While the invention will be described in conjunction with the preferred embodiments, it will readily be understood that it is not intended to limit the scope of the invention to these embodiments. On the contrary, the invention is intended to cover alternatives, modifications, and equivalents, which may be included within the spirit and scope of the inventions as defined by the appended claims.

What is claimed is:

1. An electronic device comprising:
    a storage in which a device identifier to identify a type of said electronic device is stored;
    an obtaining section configured to obtain a content which includes a plurality of particular scripts and a shared script, each of said particular scripts being associated with a respective script identifier that identifies one of a plurality of types of electronic devices,
    a control section adapted to select and execute a particular script included in said content obtained by said obtaining section, said particular script selected by said control section in accordance with said device identifier stored in said storage, so as to obtain data corresponding to said type of said electronic device; and
    said control section further adapted to execute said shared script to display said obtained data.

2. The electronic device of claim 1, wherein said shared script is executable to display said data obtained by execution of any one of said particular scripts in a common manner on any one of said types of electronic devices.

3. The electronic device of claim 2, wherein each of said particular scripts are executable to obtain data corresponding to a respective one of said types of said electronic devices.

4. The electronic device of claim 1, wherein said obtaining section is configured to receive said content via wired or wireless communication, and to store said received content in said storage.

5. The electronic device of claim 1, further comprising a transmitting means for transmitting said content stored in said storage to another electronic device.

6. The electronic device of claim 1, wherein said obtaining section is further configured to receive said content via short range communication means and store said content in said storage.

7. The electronic device of claim 1, wherein:
    said electronic device is either a mobile phone or a vehicle navigation device; and
    said plurality of particular scripts comprise a script only for said mobile phone and a script only for said vehicle navigation device.

8. The electronic device of claim 1, wherein said content is an application program described by a markup language.

9. The electronic device of claim 1, further comprising a display, wherein said shared script is configured to present a graphical user interface in said display that is similarly presented in any one of said types of electronic devices.

10. A computer program product that causes a computer included in an electronic device having a storage in which a device identifier that identifies a type of said electronic device is stored to execute a method comprising the steps of
    obtaining a content that includes a plurality of particular scripts and a shared script, each of said particular scripts being associated with a respective script identifier that identifies one of a plttrality of types of electronic devices;
    in response to selection of said content by a user, specifying a particular script included in said obtained content, said particular script being associated with said device identifier stored in said storage;
    executing said specified particular script to obtain data corresponding to said type of said electronic device; and
    executing said shared script to display said obtained data.

11. The computer program product of claim 10, wherein executing said shared script comprises outputting said data obtained by said particular script in a manner that is common to said plurality of types of electronic devices.

12. The computer program product of claim 10, wherein executing said specified particular script comprises obtaining data that is particular to said type of said electronic device.

13. The computer program product of claim 10, wherein executing said shared script comprises providing a virtual indicator by which said obtained data is depicted.

14. The computer program product of claim 13, wherein:
    said electronic device is a mobile communication terminal; and
    said virtual indicator is indicative of a volume of a ringing bell.

15. The computer program product of claim 14, further comprising transmitting said content with a communication unit of said electronic device to a vehicle navigation device, said virtual indicator indicative of a speed of a vehicle when said content is executed in said vehicle navigation device.

* * * * *

UNITED STATES PATENT AND TRADEMARK OFFICE
CERTIFICATE OF CORRECTION

PATENT NO. : 7,398,055 B2  Page 1 of 1
APPLICATION NO. : 10/777996
DATED : July 8, 2008
INVENTOR(S) : Koji Tajima et al.

It is certified that error appears in the above-identified patent and that said Letters Patent is hereby corrected as shown below:

In the Specification

In the Claims:

Column 12, Line 24, change "plttrality" to --plurality--

Signed and Sealed this

Second Day of September, 2008

JON W. DUDAS
*Director of the United States Patent and Trademark Office*